US 9,260,109 B2

(12) United States Patent
Tanaka

(10) Patent No.: US 9,260,109 B2
(45) Date of Patent: Feb. 16, 2016

(54) CONTROL DEVICE FOR HYBRID VEHICLE

(71) Applicant: Takaaki Tanaka, Susono (JP)

(72) Inventor: Takaaki Tanaka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/428,184

(22) PCT Filed: Sep. 10, 2013

(86) PCT No.: PCT/IB2013/001954
§ 371 (c)(1),
(2) Date: Mar. 13, 2015

(87) PCT Pub. No.: WO2014/045092
PCT Pub. Date: Mar. 27, 2014

(65) Prior Publication Data
US 2015/0258982 A1  Sep. 17, 2015

(30) Foreign Application Priority Data
Sep. 19, 2012  (JP) ................................ 2012-205999

(51) Int. Cl.
*B60W 20/00*  (2006.01)
*B60K 6/36*  (2007.10)
(Continued)

(52) U.S. Cl.
CPC ............... *B60W 20/108* (2013.01); *B60K 6/36* (2013.01); *B60K 6/38* (2013.01); *B60K 6/44* (2013.01); *B60K 6/442* (2013.01); *B60W 10/02* (2013.01); *B60W 10/06* (2013.01); *B60W 10/08* (2013.01); *B60W 10/10* (2013.01); *B60W 10/113* (2013.01); *B60W 20/30* (2013.01); *B60W 30/18009* (2013.01); *B60W 30/19* (2013.01); *F16H 61/688* (2013.01); *B60K 2006/4825* (2013.01); *B60W 2540/10* (2013.01); *B60W 2540/12* (2013.01); *B60Y 2400/428* (2013.01); *F16H 3/006* (2013.01); *F16H 2061/0015* (2013.01); *F16H 2306/18* (2013.01); *Y10S 903/909* (2013.01); *Y10S 903/912* (2013.01); *Y10S 903/93* (2013.01); *Y10T 477/26* (2015.01)

(58) Field of Classification Search
None
See application file for complete search history.

(56) References Cited

U.S. PATENT DOCUMENTS 6,712,734 B1  3/2004  Loeffler
2002/0189397 A1  12/2002  Sakamoto et al.
(Continued)

FOREIGN PATENT DOCUMENTS

EP  2 474 759 A1  7/2012
JP  2003-079005 A  3/2003

*Primary Examiner* — Justin Holmes
(74) *Attorney, Agent, or Firm* — Sughrue Mion, PLLC

(57) ABSTRACT

In a control device for a hybrid vehicle (1) including a dual-clutch transmission (10), a first MG (3) connected to a first input shaft (13) of the transmission (10) in a power transmittable manner and a second MG (4) connected to a second input shaft (14) of the transmission (10) in a power transmittable manner, while the vehicle (1) is travelling with the use of an internal combustion engine (2), the transmission (10) is controlled such that power transmission between the input shaft, which is interrupted in power transmission from the internal combustion engine (2), and an output system (12) is interrupted when an accelerator pedal is depressed, and the transmission (10) is controlled such that power transmission between the input shaft, which is interrupted in power transmission from the internal combustion engine (2), and the output system (12) is established by a gear train of a speed position lower than a current speed position when depression of the accelerator pedal is released.

2 Claims, 2 Drawing Sheets

(51) Int. Cl.
*B60K 6/442* (2007.10)
*B60W 10/113* (2012.01)
*B60W 30/19* (2012.01)
*F16H 61/688* (2006.01)
*B60K 6/38* (2007.10)
*B60K 6/44* (2007.10)
*B60W 10/02* (2006.01)
*B60W 10/06* (2006.01)
*B60W 10/08* (2006.01)
*B60W 10/10* (2012.01)
*B60W 30/18* (2012.01)
*F16H 3/00* (2006.01)
*B60K 6/48* (2007.10)
*F16H 61/00* (2006.01)

(56) References Cited

U.S. PATENT DOCUMENTS

2003/0074992 A1* 4/2003 Gierling ............... B60W 10/02
  74/335
2005/0119805 A1* 6/2005 Bischoff ............... B60K 6/48
  701/22
2011/0125353 A1* 5/2011 Komeda ............... B60K 6/387
  701/22
2011/0269599 A1* 11/2011 Nakasako ............. B60K 6/36
  477/5

* cited by examiner

CONTROL DEVICE FOR HYBRID VEHICLE

BACKGROUND OF THE INVENTION

1. Field of the Invention

The invention relates to a control device that is applied to a hybrid vehicle in which a dual-clutch transmission is provided and electric motors are respectively connected to two input shafts of the transmission.

2. Description of Related Art

There is known a dual-clutch transmission in which gear trains are respectively provided between a first input shaft and an output system and between a second input shaft and the output system and one of those two input shafts is selectively connected to an internal combustion engine. In addition, there is known a hybrid vehicle on which the above-described dual-clutch transmission is mounted and motors are respectively connected to input shafts of the transmission (see Japanese Patent Application Publication No. 2003-079005 (JP 2003-079005 A)). In the vehicle described in JP 2003-079005 A, when the driving force of an engine is assisted by one of the first motor and the second motor while the vehicle is travelling using the driving force of the engine, all the sleeves of transmission gears provided in association with the other one of the motors are placed in a neutral state.

In the vehicle described in JP 2003-079005 A, while the vehicle is travelling using the driving force of the engine and the driving force is being assisted by one of the motors, when a brake pedal is depressed to require deceleration involving the necessity to downshift, the sleeves associated with the other one of the motors are actuated after the brake pedal has been depressed. Therefore, a period of time required to downshift may extend.

SUMMARY OF THE INVENTION

The invention provides a control device for a hybrid vehicle, which is able to quickly downshift at the time of deceleration while improving fuel economy.

A first aspect of the invention provides a control device for a hybrid vehicle. The hybrid vehicle includes: an internal combustion engine; a dual-clutch transmission having a first input shaft connected to the internal combustion engine via a first clutch, a second input shaft connected to the internal combustion engine via a second clutch, an output system connected to a drive wheel in a power transmittable manner, a plurality of gear trains having a first gear train which is interposed between the first input shaft and the output system and a second gear train which is interposed between the second input shaft and the output system, the first gear train and the second gear train mutually having different speed ratios, a first transmission mechanism configured to be switchable between an engaged state where power transmission between the first input shaft and the output system is established by one of the gear trains interposed between the first input shaft and the output system and a neutral state where power transmission between the first input shaft and the output system is interrupted, and a second transmission mechanism configured to be switchable between an engaged state where power transmission between the second input shaft and the output system is established by one of the gear trains interposed between the second input shaft and the output system and a neutral state where power transmission between the second input shaft and the output system is interrupted; a first electric motor connected to the first input shaft in a power transmittable manner; and a second electric motor connected to the second input shaft in a power transmittable manner. The control device includes: control means for, when the vehicle travels with the use of the internal combustion engine, controlling the first clutch and the second clutch such that one of the first input shaft and the second input shaft is coupled to the internal combustion engine in a power transmittable manner and interrupting power transmission between the internal combustion engine and the other one of the first input shaft and the second input shaft, control means for changing one of the first transmission mechanism and the second transmission mechanism, which controls power transmission between the output system and the other one of the first input shaft and the second input shaft, to the neutral state when an accelerator pedal is depressed while the vehicle is travelling with the use of the internal combustion engine, and changing the one of the first transmission mechanism, and the second transmission mechanism to the engaged state such that power transmission between the output system and the other one of the first input shaft and the second input shaft is established by the gear train having a speed ratio larger than the speed ratio of the gear train that is being used for power transmission between the internal combustion engine and the output system at the time when depression of the accelerator pedal is released while the vehicle is travelling with the use of the internal combustion engine.

With the above-described control device, when the accelerator pedal is depressed while the vehicle is travelling with the use of the internal combustion engine, one of the transmission mechanisms, which controls power transmission between the output system and the other one of the first input shaft and the second input shaft, to the neutral state, so it is possible to separate the other one of the first input shaft and the second input shaft from the internal combustion engine and the output system. Thus, it is possible to prevent co-rotation of the electric motor connected to the other one of the first input shaft and the second input shaft, so it is possible to prevent wasteful consumption of the power of the internal combustion engine. Thus, it is possible to improve the fuel economy of the internal combustion engine. On the other hand, when depression of the accelerator pedal is released, the one of the transmission mechanisms is changed to the engaged state such that power transmission between the output system and the other one of the first input shaft and the second input shaft is established by the gear train having a speed ratio larger than the speed ratio of the gear train that is being used for power transmission at that timing, that is, the gear train on a lower speed position side. Therefore, when a brake pedal is depressed, it is possible to downshift only by switching the state of the first clutch and the state of the second clutch. Thus, it is possible to quickly downshift at the time of deceleration. In addition, by quickly downshifting in this way, it is possible to quickly enable engine braking stronger than engine braking before the downshift.

The above control device may further include vehicle speed determination means for determining whether a speed of the vehicle falls within a predetermined downshift range in which a downshift for changing from a current speed position to a speed position lower than the current speed position when a brake pedal is depressed, wherein the control means may be configured to change the one of the first transmission mechanism and the second transmission mechanism to the engaged state such that power transmission between the output system and the other one of the first input shaft and the second input shaft is established by the gear train having a speed ratio larger than the speed ratio of the gear train that is being used for power transmission between the internal combustion engine and the output system, when the vehicle speed determination means determines that the speed of the vehicle falls within the downshift range and depression of the accelerator pedal is released while the vehicle is travelling with the use of the internal combustion engine. In this case, when the speed of the vehicle (vehicle speed) falls outside the downshift range, the one of the transmission mechanisms is maintained in the neutral state even when depression of, the accelerator pedal is released. Therefore, it is possible to further suppress consumption of the power of the internal combustion engine, so it is possible to further, improve fuel economy.

As described above, with the above-described control device, when the accelerator pedal is depressed, the one of the transmission mechanisms, which controls power transmission between the output system and the other one of the first input shaft and the second input shaft is changed to the neutral state. Thus, it is possible to improve the fuel economy of the internal combustion engine. On the other hand, when depression of the accelerator pedal is released, the one of the transmission mechanisms is changed to the engaged state such that power transmission between the output system and the other one of the first input shaft and the second input shaft is established by the gear train on the lower speed position side. Therefore, it is possible to quickly downshift at the time of deceleration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
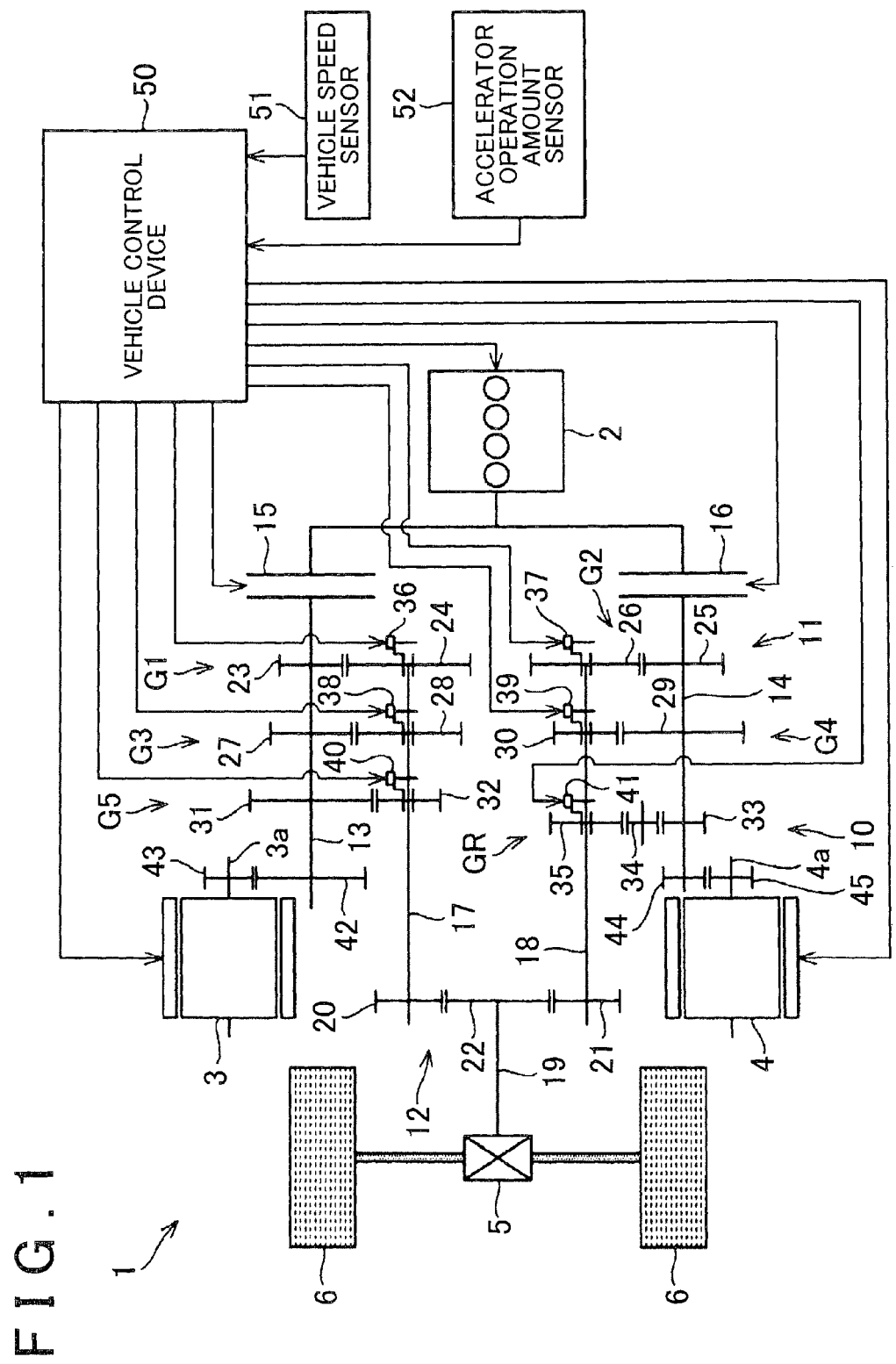
FIG. 1 is a schematic view that shows a vehicle to which a control device according to an embodiment of the invention is assembled.

FIG. 1 schematically shows a vehicle to which a control device according to an embodiment of the invention is assembled. The vehicle 1 includes an internal combustion engine (hereinafter, referred to as engine) 2, a first motor generator (hereinafter, simply referred to as first MG) 3 and a second motor generator (hereinafter, simply referred to as second MG) 4. The engine 2 serves as a drive power source. The first MG 3 serves as a first electric motor. The second MG 4 serves as a second electric motor. That is, the vehicle 1 is configured as a hybrid vehicle. The engine 2 is a known spark ignition internal combustion engine having a plurality of (four in FIG. 1) cylinders. In addition, the first MG 3 and the second MG 4 each are known as one that is mounted on the hybrid vehicle and that functions as both an electric motor and a generator. Therefore, the detailed description of them is omitted.

A transmission 10 is mounted on the vehicle 1. The transmission 10 is able to shift among a plurality of speed positions (first speed to fifth speed and reverse). The transmission 10 is a dual-clutch transmission. The transmission 10 includes an input system 11 and an output system 12. The input system 11 includes a first input shaft 13 and a second input shaft 14. The first input shaft 13 is connected to the engine 2 via a first clutch 15. The second input shaft. 14 is connected to the engine 2 via a second clutch 16. The first clutch 15 and the second clutch 16 each are a known friction clutch that is able to switch between an engaged state and a released state. In the engaged state, power is transmitted between the engine 2 and a corresponding one of the input shafts 13, 14. In the released state, the power transmission is interrupted.

The output system 12 includes a first output shaft 17, a second output shaft 18 and a drive shaft 19. As shown in the drawing, a first output gear 20 is provided on the first output shaft 17. A second output gear 21 is provided on the second output shaft 18. A driven gear 22 is provided on the drive shaft 19. The first output gear 20 and the second output gear 21 each are in mesh with the driven gear 22. The drive shaft 19 is connected to a differential mechanism 5 in a power transmittable manner. The differential mechanism 5 is a known mechanism that distributes input power to right and left drive wheels 6.

First to fifth gear trains G1 to G5 and a reverse gear train GR are interposed between the input system 11 and the output system 12. As shown in the drawing, the first gear train. G1, the third gear train G3 and the fifth gear train G5 are interposed between the first input shaft 13 and the first output shaft 17. The second gear train G2, the fourth gear train G4 and the reverse gear train GR are interposed between the second input shaft 14 and the second output shaft 18.

The first gear train G1 is formed of mutually meshing first drive gear 23 and first driven gear 24. The second gear train G2 is formed of mutually meshing second drive gear 25 and second driven gear 26. The third gear train G3 is formed of mutually meshing third drive gear 27 and third driven gear 28. The fourth gear train G4 is formed of mutually meshing fourth drive gear 29 and fourth driven gear 30. The fifth gear train G5 is formed of mutually meshing fifth drive gear 31 and fifth driven gear 32. The first to fifth gear trains G1 to G5 each are provided such that the drive gear and the driven gear are constantly in mesh with each other. Mutually different speed ratios are respectively set for the gear trains G1 to G5. The speed ratio becomes smaller in order of the first gear train G1, the second gear train G2, the third gear train G3, the fourth gear train G4 and the fifth gear train G5. The reverse gear train GR is formed of a reverse drive gear 33, an intermediate gear 34 and a reverse driven gear 35.

The first drive gear 23, the third drive gear 27 and the fifth drive gear 31 are fixed to the first input shaft 13 so as to integrally rotate with the first input shaft 13. On the other hand, the first driven gear 24, the third driven gear 28 and the fifth driven gear 32 are supported by the first output shaft 17 so as to be relatively rotatable with respect to the first output shaft 17. The second drive gear 25, the fourth drive gear 29 and the reverse drive gear 33 are fixed to the second input shaft 14 so as to integrally rotate with the second input shaft 14. On the other hand, the second driven gear 26, the fourth driven gear 30 and the reverse driven gear 35 are supported by the second output shaft 18 so as to be relatively rotatable with respect to the second output shaft 18. The intermediate gear 34 is rotatably supported by a case (not shown) of the transmission 10. As shown in the drawing, the intermediate gear 34 is in mesh with each of the reverse drive gear 33 and the reverse driven gear 35.

A first sleeve 36, a third sleeve 38 and a fifth sleeve 40 are provided on the first output shaft 17. These sleeves 36, 38, 40 are supported by the first output shaft 17 so as to integrally rotate with the first output shaft 17 and movable in an axial direction. The first sleeve 36 is provided so as to be switchable between an engaged position and a released position. In the engaged position, the first sleeve 36 is in mesh with the first driven gear 24 such that the first output shaft 17 and the first driven gear 24 integrally rotate with each other. In the released position, the meshing is released. The third sleeve 38 is provided so as to be switchable between an engaged position and a released position. In the engaged position, the third sleeve 38 is in mesh with the third driven gear 28 such that the first output shaft 17 and the third driven gear 28 rotate integrally with each other. In the released position, the meshing is released. The fifth sleeve 40 is provided so as to be switchable between an engaged position and a released position. In the engaged position, the fifth sleeve 40 is in mesh with the fifth driven gear 32 such that the first output shaft 17 and the fifth driven gear 32 rotate integrally with each other. In the released position, the meshing is released. Hereinafter, the case where all the first sleeve 36, the third sleeve 38 and the fifth sleeve 40 are switched to the released position may be called neutral state. By controlling power transmission between the first output shaft 17 and each of the driven gears 24, 28, 32 in this way, the first sleeve 36, the third sleeve 38 and the fifth sleeve 40 function as a first transmission mechanism according to the invention. The case where the first sleeve 36 is switched to the engaged position, the case where the third sleeve 38 is switched to the engaged position or the case where the fifth sleeve 40 is switched to the engaged position functions as an engaged state according to the invention.

A second sleeve 37, a fourth sleeve 39 and a reverse sleeve 41 are provided on the second output shaft 18. These sleeves 37, 39, 41 are supported by the second output shaft 18 so as to be integrally rotatable with the second output shaft 18 and movable in the axial direction. The second sleeve 37 is provided so as to be switchable between an engaged position and a released position. In the engaged position, the second sleeve 37 is in mesh with the second driven gear 26 such that the second output shaft 18 and the second driven gear 26 integrally rotate with each other. In the released state, the meshing is released. The fourth sleeve 39 is provided so as to be switchable between an engaged position and a released position. In the engaged position, the fourth sleeve 39 is in mesh with the fourth driven gear 30 such that the second output shaft 18 and the fourth driven gear 30 integrally rotate with each other. In the released position, the meshing is released. The reverse sleeve 41 is provided so as to be switchable between an engaged position and a released position. In the engaged position, the reverse sleeve 41 is in mesh with the reverse driven gear 35 such that the second output shaft 18 and the reverse driven gear 35 integrally rotate with each other. In the released position, the meshing is released. Hereinafter, the case where all the second sleeve 37, the fourth sleeve 39 and the reverse sleeve 41 are switched to the released position may be called neutral state. By controlling power transmission between the second output shaft 18 and each of the driven gears 26, 30, 35, the second sleeve 37, the fourth sleeve 39 and the reverse sleeve 41 function as a second transmission mechanism according to the invention. The case where the second sleeve 37 is switched to the engaged position, the case where the fourth sleeve 39 is switched to the engaged position or the case where the reverse sleeve 41 is switched to the engaged position functions as an engaged state according to the invention.

Although not shown in the drawing, a synchronizing mechanism for synchronizing rotation at the time of bringing each of the sleeves 36 to 41 into mesh with a corresponding one of the driven gears 24, 26, 28, 30, 32, 35 is provided for each driven gear on the output shafts 17, 18. These synchronizing mechanisms each may be a synchronizing mechanism for synchronizing rotation through friction engagement, and, for example, a known key-type synchromesh mechanism. Therefore, the detailed description of each synchronizing mechanism is omitted.

A first driven gear 42 is provided on the first input shaft 13. A first drive gear 43 that is in mesh with the first driven gear 42 is provided on an output shaft 3a of the first MG 3. Thus, the first MG 3 is connected to the first input shaft 13 at a power transmittable manner. The speed ratio between the first drive gear 43 and the first driven gear 42 is set such that the rotation of the first MG 3 is decelerated and is then transmitted to the first input shaft 13. A second driven gear 44 is provided on the second input shaft 14. A second drive gear 45 that is in mesh with the second driven gear 44 is provided on an output shaft 4a of the second MG 4. Thus, the second MG 4 is connected to the second input shaft 14 in a power transmittable manner. The speed ratio between the second drive gear 45 and the second driven gear 44 is set such that the second MG 4 and the second input shaft 14 rotate at substantially the same rotation speed. In this way, the speed ratio between the first drive gear 43 and the first driven gear 42 and the speed ratio between the second drive gear 45 and the second driven gear 44 are set so as to be different from each other.

The operations of the first clutch 15, the second clutch 16 and the sleeves 36 to 41 are controlled by a vehicle control device 50. In addition, the operations of the engine 2, the first MG 3 and the second MG 4 are also controlled by the vehicle control device 50. The vehicle control device 50 is configured as a computer unit that includes a microprocessor and peripheral devices, such as a RAM and a ROM. The peripheral devices are necessary to operate the microprocessor. The vehicle control device 50 holds various control programs for appropriately causing the vehicle 1 to travel. The vehicle control device 50 controls controlled objects, such as the engine 2 and the MGs 3, 4, by executing these programs. Various sensors for acquiring information about the vehicle 1 are connected to the vehicle control device 50. For example, a vehicle speed sensor 51, an accelerator operation amount sensor 52, and the like, are connected to the vehicle control device 50. The vehicle speed sensor 51 outputs a signal corresponding to the speed of the vehicle 1 (vehicle speed). The accelerator operation amount, sensor 52 outputs a signal corresponding to a depression amount of an accelerator pedal, that is, an accelerator operation amount. In addition, a shift lever (not shown) is also connected to the vehicle control device 50. Other than the above, various sensors, switches, and the like, are connected to the vehicle control device 50; however, illustration of them is omitted.

Figure 2:
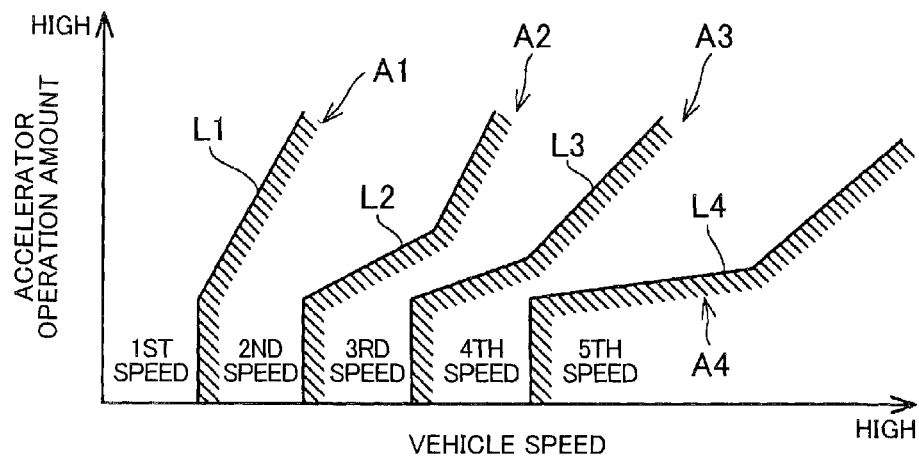
FIG. 2 is a view that shows an example of a shift line map.

The vehicle control device 50 changes the speed position of the transmission 10 on the basis of the vehicle speed and the accelerator operation amount. The ROM of the vehicle control device 50 stores a shift line map that shows the correlation among a vehicle speed, an accelerator operation amount and a speed position, shown as an example in FIG. 2. The vehicle control device 50 sets the speed position based on a current travel state of the vehicle 1 on the basis of the shift line map. The operations of the sleeves 36 to 41 are controlled such that the transmission 10 is changed to the set speed position.

The vehicle control device 50 switches the drive power source of the vehicle 1 on the basis of the vehicle speed, or the like. The vehicle control device 50 drives the drive wheels 6 with the use of the first MG 3 or the second MG 4 when the vehicle speed is lower than a predetermined determination speed, and drives the drive wheels 6 mainly with the use of the engine 2 when the vehicle speed is higher than or equal to the determination speed. When the drive wheels 6 are being driven with the use of the engine 2, the driving may be assisted by the first MG 3 or the second. MG 4. When the drive wheels 6 are driven with the use of the first MG 3 or the second MG 4, both the first clutch 15 and the second clutch 16 are switched to the released state. The drive wheels 6 are driven with the use of the MG associated with the input shaft having the speed position set in accordance with the above-described setting method. When the drive wheels 6 are driven with the use of the engine 2, one of the first clutch 15 and the second clutch 16, which is associated with the input shaft having the speed position set in accordance with the above-described setting method, is switched to the engaged state, and the other clutch is switched to the released state. Thus, the power of the engine 2 is transmitted to the drive wheels 6.

The vehicle control device 50 switches all the sleeves on the input shaft, which is not associated with power transmission, to the released position when the drive wheels 6 are being driven with the use of the engine 2, in other words, when the vehicle 1 is travelling using the engine 2. For example, when the speed position is third speed and the first input shaft 13 is associated with power transmission, all the second sleeve 37, the fourth sleeve 39 and the reverse sleeve 41 on the second input shaft 14 are switched to the released position. However, when depression of the accelerator pedal is released, that is, when the accelerator becomes off, the sleeve of the speed position having a larger speed ratio than the current speed position, that is, the sleeve of a lower speed position, among the sleeves on the input shaft not associated with power transmission is switched to the engaged position. For example, when the accelerator becomes off while the speed position is third speed, the second sleeve 37 is switched to the engaged position.

Figure 3:
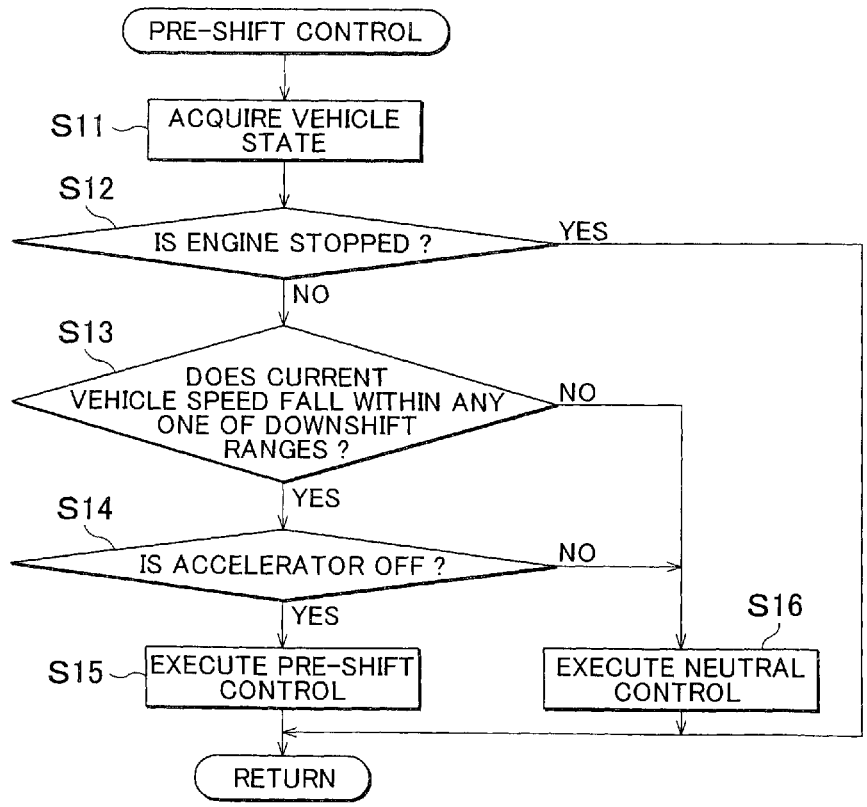
FIG. 3 is a flowchart that shows a pre-shift control routine that is executed by the vehicle control device.

FIG. 3 shows a pre-shift control routine that is executed by the vehicle control device 50 in order to control the operations of the sleeves 36 to 41 in this way. The control routine is repeatedly executed at predetermined intervals while the vehicle 1 is travelling. By executing the control routine, the vehicle control device 50 functions as control means according to the invention.

In the control routine, the vehicle control device 50 initially acquires the state of the vehicle 1 in step S11. For example, a vehicle speed, an accelerator operation amount, and the like, are acquired as the state of the vehicle 1. In the subsequent step S12, the vehicle control device 50 determines whether the engine 2 is stopped. When it is determined that the engine 2 is stopped, the current control routine is ended.

On the other hand, when it is determined that the engine 2 is in operation, the process proceeds to step S13, and the vehicle control device 50 determines whether the current vehicle speed falls within any one of downshift ranges in which a downshift is required if the brake pedal is depressed. This determination is carried out by consulting the shift line map shown in FIG. 2. Shaded ranges A1 to A4 in this map are set as the downshift ranges. As is apparent from the graph, a predetermined range that is surrounded by each of shift lines L1 to L4 and a speed obtained by adding a predetermined value to a corresponding one of the shift lines L1 to L4 is set as the downshift range. For example, when the current speed position is third speed, the vehicle control device 50 determines whether the vehicle speed falls within the downshift range A2. By executing this process, the vehicle control device 50 functions as vehicle speed determination means according to the invention.

When it is determined that the vehicle speed falls within any one of the downshift ranges, the process proceeds to step S14, and the vehicle control device 50 determines whether the accelerator is off, that is, whether depression of the accelerator pedal is released. When it is determined that the accelerator is off, the process proceeds to step S15, and the vehicle control device 50 executes pre-shift control. In the pre-shift control, the sleeve of the speed position having a larger speed ratio than the current speed position among the sleeves on the input shaft not associated with power transmission is switched to the engaged position as described above. For example, when the current speed position is third speed, the second sleeve 37 is switched to the engaged position. When the intended sleeve has been already switched to the engaged position, that state is maintained. After that, the current control routine is ended.

On the other hand, when it is determined that the vehicle speed falls outside the downshift ranges or when it is determined that the accelerator is not off, that is, the accelerator pedal is depressed, the process proceeds to step S16, and the vehicle control device 50 executes neutral control. In the neutral control, all the sleeves on the input shaft not associated with power transmission are switched to the released position as described above. When the intended sleeves have been already switched to the released position, that state is maintained. After that, the current control routine is ended.

As described above, in the invention, when the vehicle is travelling using the engine 2 and the accelerator pedal is not depressed, all the sleeves on the input shaft not associated with power transmission are switched to the released position. Therefore, it is possible to separate the input shaft, which is not associated with power transmission, from, the engine 2 and the output system 12. In this case, it is possible to prevent co-rotation of the MG connected to that input shaft, so it is possible to prevent wasteful consumption of the power of the engine 2. Thus, it is possible to improve the fuel economy of the engine 2.

On the other hand, while the vehicle is travelling using the engine 2, when it is determined that the vehicle speed falls within any one of the downshift ranges and the accelerator becomes off, the sleeve of the speed position having a larger speed ratio than the current speed position among the sleeves on the input shaft not associated with power transmission is switched to the engaged position. Therefore, when the brake pedal is depressed thereafter, it is possible to carry out a shift only by switching the state of the first clutch 15 and the state of the second clutch 16. Thus, it is possible to quickly downshift. In addition, by quickly downshifting in this way, it is possible to quickly enable engine braking stronger than engine braking before the downshift.

A condition that pre-shift control is executed is not limited to the case where it is determined that the vehicle speed falls within any one of the downshift ranges and the accelerator becomes off. When the accelerator becomes off while the vehicle speed falls outside the downshift ranges, pre-shift control may be executed.

The invention is not limited to the above-described embodiment, and may be implemented in various forms. For example, in the above-described embodiment, the input shafts and the motor generators are respectively connected via the gears in a power transmittable manner; instead, the output shafts of the motor generators may be directly connected to the corresponding input shafts. The transmission of the hybrid vehicle to which the invention is applied is not limited to a forward five-speed transmission, and may be a forward four-speed transmission or a forward six or more speed transmission.

The invention claimed is:

1. A control device for a hybrid vehicle, the hybrid vehicle including
an internal combustion engine, a dual-clutch transmission, a first electric motor, and a second electric motor, the dual-clutch transmission including a first input shaft, a second input shaft, an output system, a plurality of gear trains, a first transmission mechanism, and a second transmission mechanism, the first input shaft connected to the internal combustion engine via a first clutch, the second input shaft connected to the internal combustion engine via a second clutch, the output system connected to a drive wheel, the plurality of gear trains including a first gear train which is interposed between the first input shaft and the output system and a second gear train which is interposed between the second input shaft and the output system, the first gear train and the second gear train mutually having different speed ratios, the first transmission mechanism configured to be switched between an engaged state where power transmission between the first input shaft and the output system is established by one of the gear trains interposed between the first input shaft and the output system and a neutral state where power transmission between the first input shaft and the output system is interrupted, the second transmission mechanism configured to be switched between an engaged state where power transmission between the second input shaft and the output system is established by one of the gear trains interposed between the second input shaft and the output system and a neutral state where power transmission between the second input shaft and the output system is interrupted, the first electric motor connected to the first input shaft, the second electric motor connected to the second input shaft, the control device comprising:

a computer configured to, when the hybrid vehicle travels with the use of the internal combustion engine, control the first clutch and the second clutch such that one of the first input shaft and the second input shaft is coupled to the internal combustion engine in a power transmittable manner and interrupting power transmission between the internal combustion engine and the other one of the first input shaft and the second input shaft, the computer configured to, when an accelerator pedal is depressed while the hybrid vehicle is travelling with the use of the internal combustion engine, control the one of the first transmission mechanism and the second transmission mechanism, which controls power transmission between the output system and the other one of the first input shaft and the second input shaft, to the neutral state, the computer configured to, when depression of the accelerator pedal is released while the hybrid vehicle is travelling with the use of the internal combustion engine, control the one of the first transmission mechanism and the second transmission mechanism to the engaged state such that power transmission between the output system and the other one of the first input shaft and the second input shaft is established by the gear train having a speed ratio larger than the speed ratio of the gear train that is being used for power transmission between the internal combustion engine and the output system, the computer configured to determine when a speed of the hybrid vehicle falls within a predetermined downshift range in which a downshift for changing from a current speed position to a speed position lower than the current speed position is required when a brake pedal is depressed, and the computer configured to, when the speed of the hybrid vehicle falls within the predetermined downshift range and depression of the accelerator pedal is released while the hybrid vehicle is travelling with the use of the internal combustion engine, control the one of the first transmission mechanism and the second transmission mechanism to the engaged state such that power transmission between the output system and the other one of the first input shaft and the second input shaft is established by the gear train having a speed ratio larger than the speed ratio of the gear train that is being used for power transmission between the internal combustion engine and the output system.

2. The control device according to claim 1, wherein the computer is configured to, when the speed of the hybrid vehicle falls outside the predetermined downshift range, control the one of the first transmission mechanism and the second transmission mechanism to the neutral state.

* * * * *